US006734868B2

(12) United States Patent
Gornstein et al.

(10) Patent No.: US 6,734,868 B2
(45) Date of Patent: May 11, 2004

(54) ADDRESS GENERATOR FOR VIDEO PIXEL REORDERING IN REFLECTIVE LCD

(75) Inventors: Viktor L. Gornstein, New York, NY (US); John E. Dean, Stormville, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 306 days.

(21) Appl. No.: 10/028,380

(22) Filed: Dec. 21, 2001

(65) Prior Publication Data

US 2003/0117349 A1 Jun. 26, 2003

(51) Int. Cl.[7] .............................................. G06F 12/06
(52) U.S. Cl. .......................... 345/572; 345/98; 345/104
(58) Field of Search ................................ 345/572, 520, 345/557, 545, 530, 564, 501, 87, 98, 104, 213

(56) References Cited

U.S. PATENT DOCUMENTS 5,268,681 A 12/1993 Lin et al. .................... 345/200
6,215,507 B1 4/2001 Nally et al. ................. 345/516
6,384,809 B1 * 5/2002 Smith .......................... 345/87
6,522,319 B1 * 2/2003 Yamazaki .................... 345/94

* cited by examiner

*Primary Examiner*—Kee M. Tung

(57) ABSTRACT

An address generator for a pixel shuffler used in a relective liquid crystal display (RLCD) digital video system, and a pixel shuffler incorporating such an address generator. The address generator includes a small, dual port SRAM 160×8, a combinatorial converter having a pair of inputs and an output representing a predetermined relationship of the inputs, a pixel counter with a pair of decoders, a line counter, a computing block for selectively implementing a mirror reflection of the pixel addresses, as well as a plurality of D flip flops and logic elements. The pixel shuffler operates in read-modify-write mode, whereby any address location of memory is read and immediately overwritten with the new data. This permits operation with only one bank of SRAM 320×96 rather than the customary two banks for prior art pixel shufflers using the so-called Ping Pong method.

13 Claims, 6 Drawing Sheets

| VIDEO LINE NUMBER | ADDRESS | | | | | | | | | | |
|---|---|---|---|---|---|---|---|---|---|---|---|
| 0 | 0, | 1, | 2, | 3, | 4, | 5, | ... | 155, | 156, | 157, | 158, | 159; |
| 1 | 0, | 40, | 80, | 120, | 1, | 41, | ... | 158, | 39, | 79, | 119, | 159; |
| 2 | 0, | 10, | 20, | 30, | 40, | 50, | ... | 119, | 129, | 139, | 149, | 159; |
| 3 | 0, | 82, | 5, | 87, | 10, | 92, | ... | 149, | 72, | 154, | 77, | 159; |
| 4 | 0, | 100, | 41, | 141, | 82, | 23, | ... | 77, | 18, | 118, | 59, | 159; |
| 5 | 0, | 25, | 50, | 75, | 100, | 125, | ... | 59, | 84, | 109, | 134, | 159; |
| 6 | 0, | 46, | 92, | 138, | 25, | 71, | ... | 134, | 21, | 67, | 113, | 159; |
| 7 | 0, | 91, | 23, | 114, | 46, | 137, | ... | 113, | 45, | 136, | 68, | 159; |
| 8 | 0, | 142, | 125, | 108, | 91, | 74, | ... | 68, | 51, | 34, | 17, | 159; |
| 9 | 0, | 115, | 71, | 27, | 142, | 98, | ... | 17, | 132, | 88, | 44, | 159; |
| 10 | 0, | 148, | 137, | 126, | 115, | 104, | ... | 44, | 33, | 22, | 11, | 159; |
| 11 | 0, | 37, | 74, | 111, | 148, | 26, | ... | 11, | 48, | 85, | 122, | 159; |
| 12 | 0, | 49, | 98, | 147, | 37, | 86, | ... | 122, | 12, | 61, | 110, | 159; |
| 13 | 0, | 52, | 104, | 156, | 49, | 101, | ... | 110, | 3, | 55, | 107, | 159; |
| 14 | 0, | 13, | 26, | 39, | 52, | 65, | ... | 107, | 120, | 133, | 146, | 159; |
| 15 | 0, | 43, | 86, | 129, | 13, | 56, | ... | 146, | 30, | 73, | 116, | 159; |
| 16 | 0, | 130, | 101, | 72, | 43, | 14, | ... | 116, | 87, | 58, | 29, | 159; |
| 17 | 0, | 112, | 65, | 18, | 130, | 83, | ... | 29, | 141, | 94, | 47, | 159; |
| 18 | 0, | 28, | 56, | 84, | 112, | 140, | ... | 47, | 75, | 103, | 131, | 159; |
| 19 | 0, | 7, | 14, | 21, | 28, | 35, | ... | 131, | 138, | 145, | 152, | 159; |
| 20 | 0, | 121, | 83, | 45, | 7, | 128, | ... | 152, | 114, | 76, | 38, | 159; |
| 21 | 0, | 70, | 140, | 51, | 121, | 32, | ... | 38, | 108, | 19, | 89, | 159; |
| 22 | 0, | 97, | 35, | 132, | 70, | 8, | ... | 89, | 27, | 124, | 62, | 159; |
| 23 | 0, | 64, | 128, | 33, | 97, | 2, | ... | 62, | 126, | 31, | 95, | 159; |
| 24 | 0, | 16, | 32, | 48, | 64, | 80, | ... | 95, | 111, | 127, | 143, | 159; |
| 25 | 0, | 4, | 8, | 12, | 16, | 20, | ... | 143, | 147, | 151, | 155, | 159; |
| 26 | 0, | 1, | 2, | 3, | 4, | 5, | ... | 155, | 156, | 157, | 158, | 159; |

FIG. 1

| VIDEO LINE NUMBER | ADDRESS | | | | | | | | | | |
|---|---|---|---|---|---|---|---|---|---|---|---|
| 0 | 0, | 1, | 2, | 3, | 4, | 5, | ... | 155, | 156, | 157, | 158, | 159; |
| 1 | 159, | 119, | 79, | 39, | 158, | 118, | ... | 1, | 120, | 80, | 40, | 0; |
| 2 | 0, | 10, | 20, | 30, | 40, | 50, | ... | 119, | 129, | 139, | 149, | 159; |
| 3 | 159, | 77, | 154, | 72, | 149, | 67, | ... | 10, | 87, | 5, | 82, | 0; |
| 4 | 0, | 100, | 41, | 141, | 82, | 23, | ... | 77, | 18, | 118, | 59, | 159; |
| 5 | 159, | 134, | 109, | 84, | 59, | 34, | ... | 100, | 75, | 50, | 25, | 0; |
| 6 | 0, | 46, | 92, | 138, | 25, | 71, | ... | 134, | 21, | 67, | 113, | 159; |
| 7 | 159, | 68, | 136, | 45, | 113, | 22, | ... | 46, | 114, | 23, | 91, | 0; |
| 8 | 0, | 142, | 125, | 108, | 91, | 74, | ... | 68, | 51, | 34, | 17, | 159; |
| 9 | 159, | 44, | 88, | 132, | 17, | 61, | ... | 142, | 27, | 71, | 115, | 0; |
| 10 | 0, | 148, | 137, | 126, | 115, | 104, | ... | 44, | 33, | 22, | 11, | 159; |
| 11 | 159, | 122, | 85, | 48, | 11, | 133, | ... | 148, | 111, | 74, | 37, | 0; |
| 12 | 0, | 49, | 98, | 147, | 37, | 86, | ... | 122, | 12, | 61, | 110, | 159; |
| 13 | 159, | 107, | 55, | 3, | 110, | 58, | ... | 49, | 156, | 104, | 52, | 0; |
| 14 | 0, | 13, | 26, | 39, | 52, | 65, | ... | 107, | 120, | 133, | 146, | 159; |
| 15 | 159, | 116, | 73, | 30, | 146, | 103, | ... | 13, | 129, | 86, | 43, | 0; |
| 16 | 0, | 130, | 101, | 72, | 43, | 14, | ... | 116, | 87, | 58, | 29, | 159; |
| 17 | 159, | 47, | 94, | 141, | 29, | 76, | ... | 130, | 18, | 65, | 112, | 0; |
| 18 | 0, | 28, | 56, | 84, | 112, | 140, | ... | 47, | 75, | 103, | 131, | 159; |
| 19 | 159, | 152, | 145, | 138, | 131, | 124, | ... | 28, | 21, | 14, | 7, | 0; |
| 20 | 0, | 121, | 83, | 45, | 7, | 128, | ... | 152, | 114, | 76, | 38, | 159; |
| 21 | 159, | 89, | 19, | 108, | 38, | 127, | ... | 121, | 51, | 140, | 70, | 0; |
| 22 | 0, | 97, | 35, | 132, | 70, | 8, | ... | 89, | 27, | 124, | 62, | 159; |
| 23 | 159, | 95, | 31, | 126, | 62, | 157, | ... | 97, | 33, | 128, | 64, | 0; |
| 24 | 0, | 16, | 32, | 48, | 64, | 80, | ... | 95, | 111, | 127, | 143, | 159; |
| 25 | 159, | 155, | 151, | 147, | 143, | 139, | ... | 16, | 12, | 8, | 4, | 0; |
| 26 | 0, | 1, | 2, | 3, | 4, | 5, | ... | 155, | 156, | 157, | 158, | 159; |

FIG. 2

ADDRESS GENERATOR FOR VIDEO PIXEL REORDERING IN REFLECTIVE LCD

TECHNICAL FIELD

This invention relates generally to digital video and, more particularly, to Liquid Crystal Display (LCD) control.

BACKGROUND TECHNOLOGY

Reflective Liquid Crystal Display (RLCD) panels are usually built with sectionized digital video inputs. For example, a previously known RCDL panel of 1280×1024 pixels is interfacing digital video in the form of four sections of 320×1024 pixels each. Moreover, each section has independent 8-bit video inputs for odd and even pixels. For that reason, it is necessary to reorder pixels of every video line. This is normally implemented by reordering electronics, or so-called remapper, usually comprising three major elements: interleaver, pixel shuffler and corner turner.

The interleaver creates 32-bit quad-pixel groups (also known as, and hereinafter termed, "quadlets") of only odd or only even video pixels. Such an interleaving is done for each of three colors (red, green and blue) and each of three 32-bit outputs, providing 320 quadlets per video line. The shuffler receives, on each of three inputs, quadlets sequentially numbered 0, 1, 2, 3 . . . 319 and outputs them in the sequence 0, 1, 80, 81, 160, 161, 240, 241, 2, 3, 82, 83 . . . 238, 239, 318, 319. In RLCD projectors wherein the rear projection mode is implemented rather than the front projection mode, every video line is mirror-reflected and the shuffler outputs quadlets in the sequence: 319, 318, 239, 238, 159, 158, 79, 78 . . . 81, 80, 1, 0. The corner turner then reorders 8-bit video pixels within each group of eight adjacent quadlets.

The operation carried out by the pixel shuffler can be represented as a matrix transposition. Then a matrix of 40×4 should be transposed where two adjacent quadlets represent one element of such a matrix. A pixel shuffler operating in the conventional manner (i.e., by the so-called Ping Pong method) includes two banks of SRAM 320×96 each. During a video line period one of the banks is filled with quadlets in the specified sequence as the other bank is read with reading address order 0, 1, 80, 81, 160, 161, 240, 241, 2, 3, 82, 83 . . . 238, 239, 318, 319. Although the Ping Pong method of pixel shuffling is very reliable, it requires 60K bits of SRAM and is thus quite memory expensive.

The present invention is directed to overcoming one or more of the problems or disadvantages associated with the relevant technology.

SUMMARY OF THE INVENTION

As will be more readily understood and fully appreciated from the following detailed description of the preferred embodiment, the present invention is embodied in a pixel shuffler having only one bank of 320×96 SRAM and incorporating a device termed an address generator, allowing the memory to operate in a read-modify-write mode. This means that any address location of memory is read and immediately overwritten with the new data. In this case, every new video line will require a new address order. Thus, as implemented, the invention allows the pixel shuffling function to be carried out with half the memory capacity of conventional systems.

BRIEF DESCRIPTION OF THE DRAWINGS

FIG. 1 is an example of a sequence of addresses for 27 successive video lines using the addressing technique of the present invention;

FIG. 2 is a sequence of addresses corresponding to the mirror reflection of each video line in the example of FIG. 1;

BEST MODE FOR CARRYING OUT THE INVENTION

Figure 3:
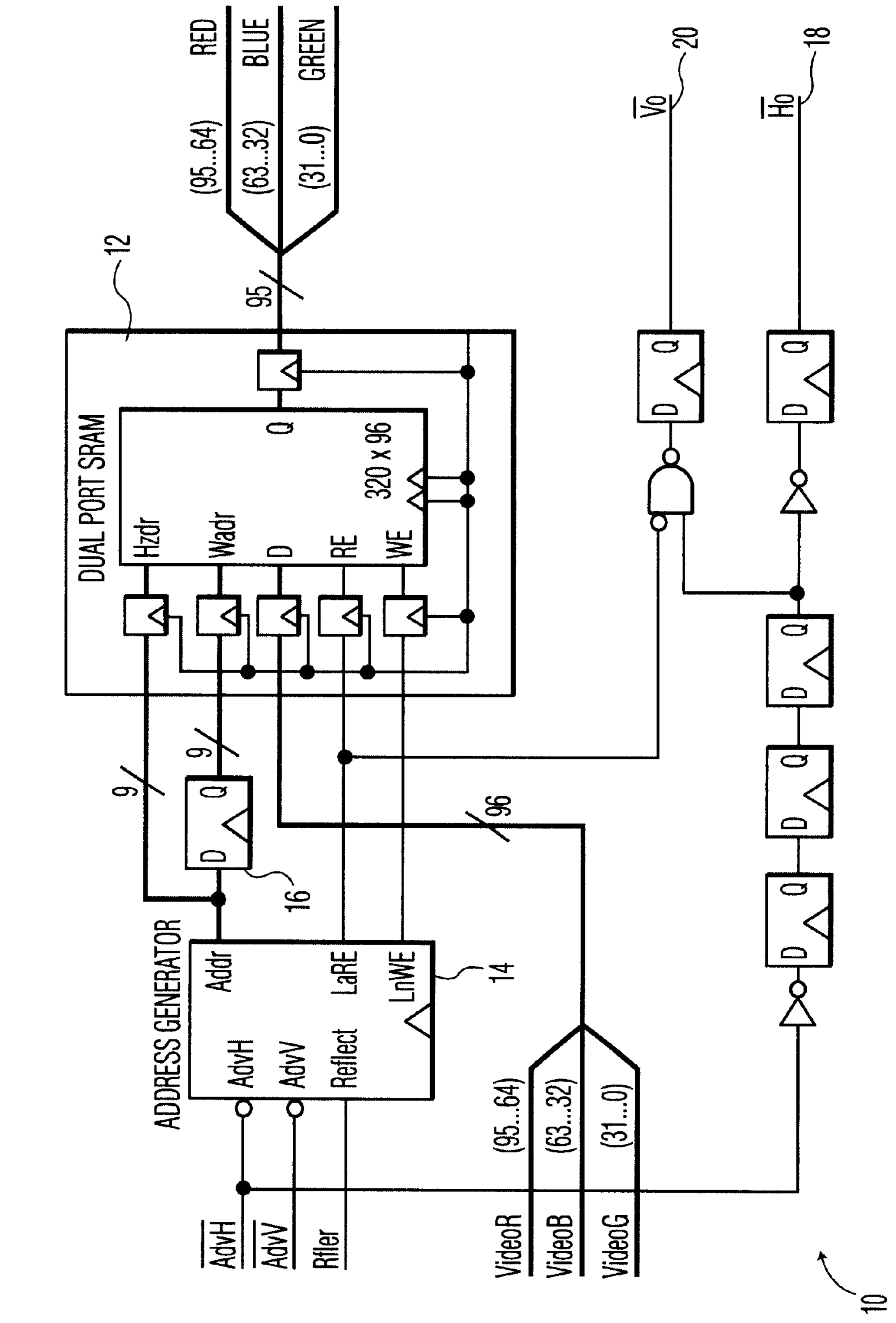
FIG. 3 is a block diagram of the preferred embodiment of the shuffler incorporating the address generator of the invention.

As previously mentioned, with the single bank of SRAM operating in the read-modify-write mode, every new video line will require a new address order. If the least significant of nine address bits is ignored, e.g., quadlets 318 and 319 are parts of the same element of 80×4 matrix and the 8 most significant bits of their addresses are the same, the address order will be changed in the manner indicated in FIG. 1. As seen from this simulation, 26 unique address orders (lines 0–25) are generated, and are then repeated (video line 26 repeats the address order for video line 0, etc.). If the mirror reflection of the video lines is implemented, the sequence of addresses will be as shown in FIG. 2.

The algorithm for the address is represented with the following equations. The address for the simulation shown in FIG. 1 may be expressed:

$$A_{ni}=\mathrm{Int}[A_{(n-1)i}/4]+40*\mathrm{Remainder}[A_{(n-1)i}/4]$$

where n is a video line number and i is a matrix element number from 0 to 159.

The address for the mirror reflection (FIG. 2) is then expressed:

$$A_{ni}=\mathrm{Int}[B_{(n-1)i}/4]+40*\mathrm{Remainder}[B_{(n-1)i}/4]$$

where $B_{(n-1)}$)i=159−$A_{(n-1)i}$.

A block diagram of the preferred embodiment of the shuffler, denoted generally by reference numeral 10, is shown in FIG. 3. Shuffler 10 includes a single bank of Dual Port SRAM 320×96, denoted by reference numeral 12, address generator 14, 9-bit address register 16, D-flip-flops and logic elements. Shuffler 10 is synchronized with 3 clock periods advanced (relative to active video) horizontal and vertical, with sync pulses one clock period in length (active low) applied to corresponding shuffler inputs AdvH and AdvV. The horizontal and vertical sync pulses are active at the corresponding outputs Ho and Vo, indicated in FIG. 3 by reference numerals 18 and 20, respectively, at the clock period prior to the first active video output. The read and write operations of the memory are implemented at the respective data ports independently and simultaneously. When an address appears at the output (Addr) of address generator 14, memory bank 12 reads the data at this address. At the next clock period, this address is written into address register 16 and memory bank 12 downloads a new video data at the same address.

Figure 4:
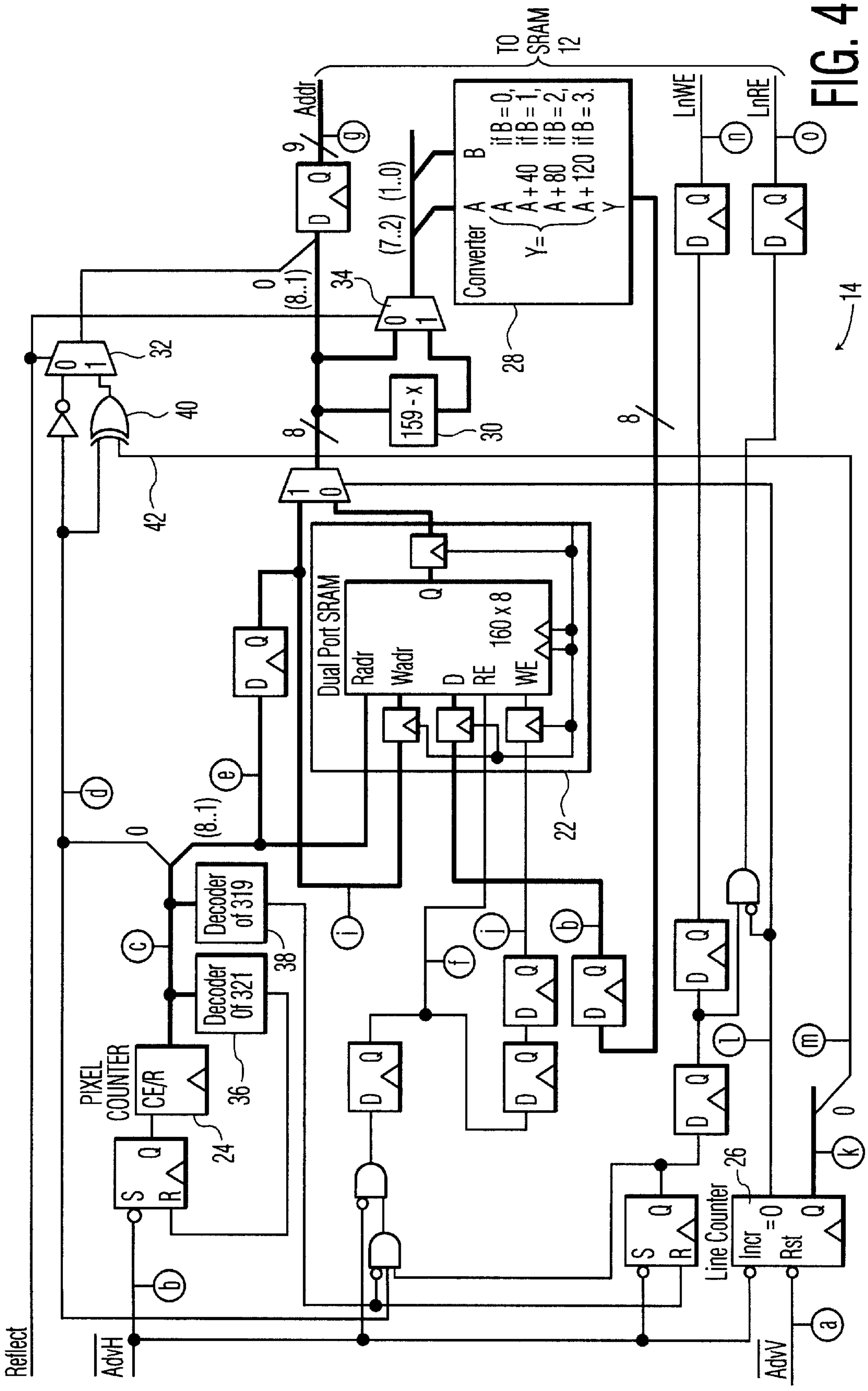
FIG. 4 is an electrical schematic of the address generator of FIG. 3.

A schematic of the preferred embodiment of address generator 14 is shown in FIG. 4. Address generator 14 includes small Dual Port SRAM 160×8, denoted by reference numeral 22, pixel counter 24, line counter 26, combinatorial converter 28, calculating block 30 (159-X), two multiplexers 32 and 34, two decoders 36 and 38, flip-flops and logic elements. During the first video line (line count=0)

the address is taken from pixel counter 24 and the first line addresses (0, 1, 2, 3, 4 . . . 319) are sent to the output. At the same time, the 8 most significant bits of the current address are converted by combinatorial converter 28 and downloaded into SRAM 22. During the first video line, addresses 0, 1, 2, 3, 4 . . . 159 of the SRAM are filled with the data 0, 40, 80, 120, 1 . . . 159. During every video line other than the first, the output is taken from SRAM 22; also, data from the SRAM is converted and written back to the SRAM. As indicated on the drawing (FIG. 4), converter 28 receives two inputs, labeled "A" and "B", and establishes a value for the output "Y" as a function of the first input plus a predetermined number (0, 40, 80, 120) for a consecutive sequence of values (0, 1, 2, 3) of the second input. In the example given, when B=0, Y=A; when B=1, Y=A+40; when B=2, Y=A+80, and when B=3, Y=A+120. During the second video line, the same SRAM locations will be overwritten with 0, 10, 20, 30, 40 . . . 159. The least significant bit of the output address is simply toggling within the video line period and can be obtained from the least significant bit of pixel counter 24.

If the "reflect" input (the line so labeled at the top of the schematic) is active, the horizontal mirror reflection is implemented. In this case, the data for converter 28 are taken from the SRAM output through block 30 implementing the 159-X operation. In addition, the phase of the least significant address bit toggling for a given video line should always be opposite to that of the previous video line. This is related to the fact that, when operating in the horizontal mirror reflection mode, whichever of two adjacent quadlets is downloaded into memory first should be the last to be read from the memory during the next line of video. For instance, quadlet 318 is written into the memory prior to quadlet 319; however, if mirror reflection is operative, quadlet 319 is read prior to quadlet 318 during the next video line. The changing of the least significant bit toggling phase is provided by exclusive OR gate 40 which has an input 42 connected to the least significant bit of video line counter 26.

Other aspects and features of the present invention can be obtained from a study of the drawings, the disclosure, and the appended claims.

FUNCTIONAL DESCRIPTION

Figures 5A, 5B, 5C, 5D, 5E, 5F, 5G, 5H, 5I, 5J, 5K, 5L, 5M, 5N, 5O, 5P:
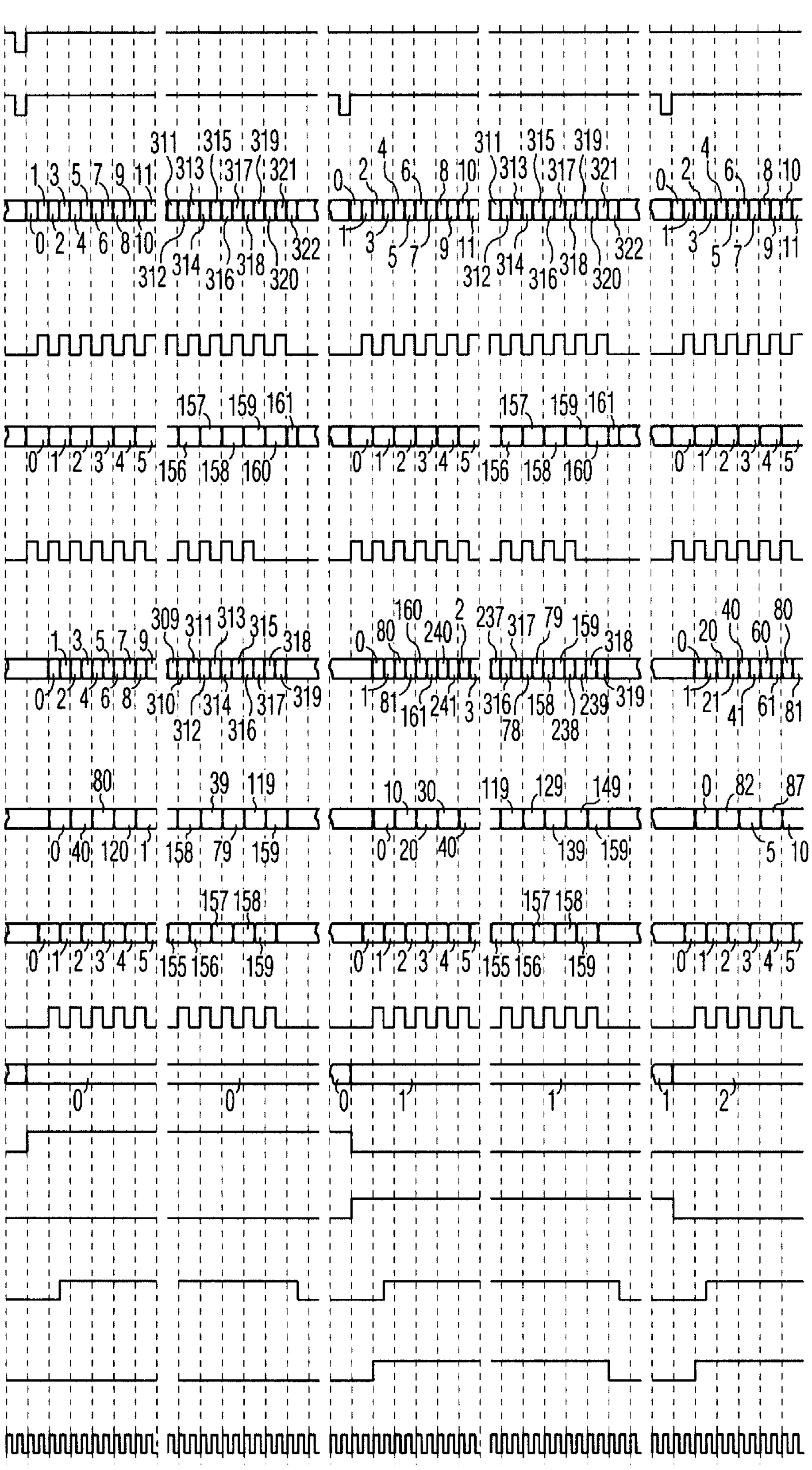
FIGS. 5 and 6 are timing diagrams showing address generator operation without and with horizontal mirror reflection, respectively.
Figures 6A, 6B, 6C, 6D, 6E, 6F, 6G, 6H, 6I, 6J, 6K, 6L, 6M, 6N, 6O, 6P:
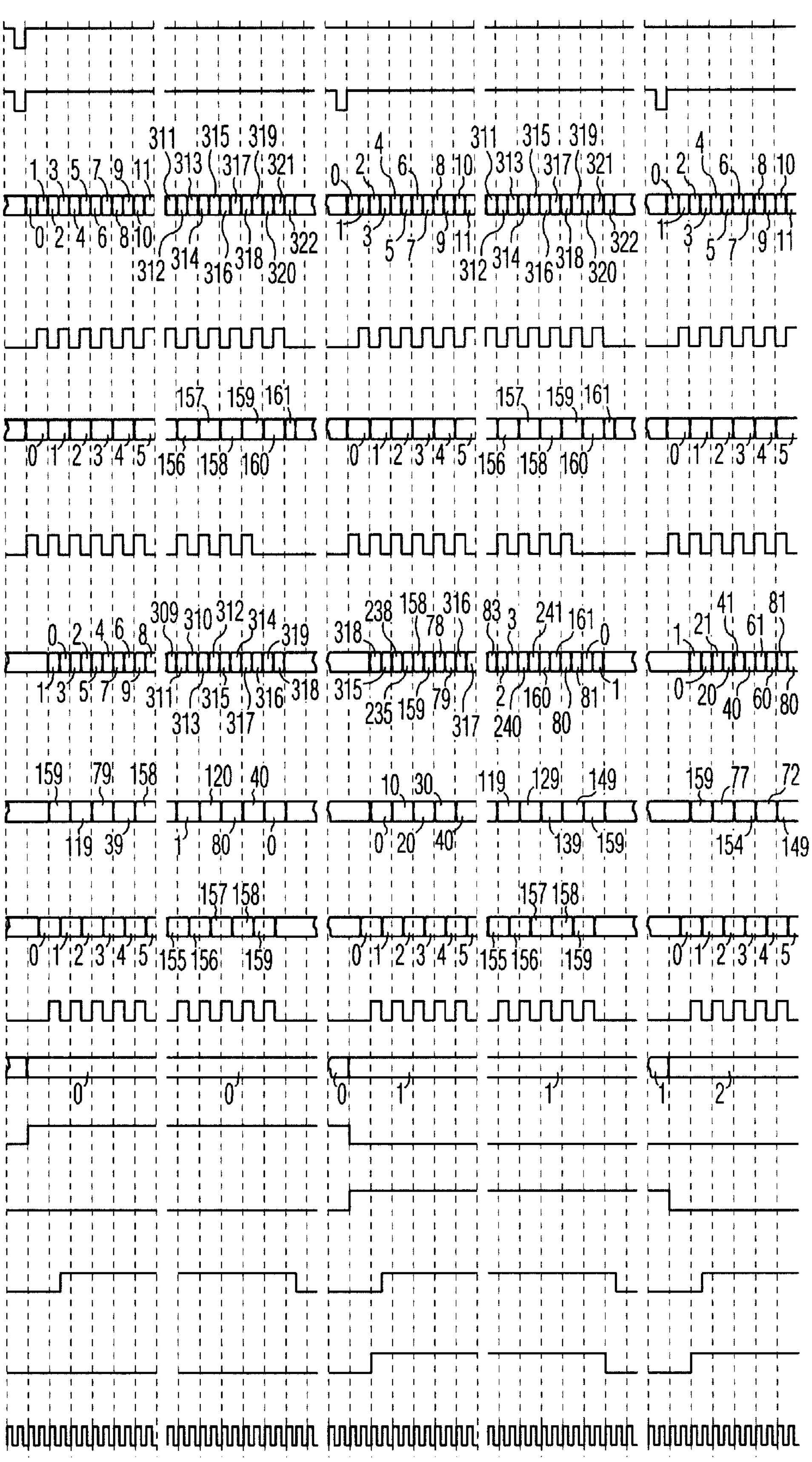

Timing diagrams of address generator 14 operation are shown without and with implementation of horizontal mirror reflection in FIGS. 5 and 6, respectively. The points on the schematic (FIG. 4) are marked with the same letters (inside bold circles) as the corresponding lines on the timing diagrams of FIGS. 5 and 6, thereby enabling those skilled in the art to comprehend and implement operation of address generator 14 with precise timing of all signals.

What is claimed is:

1. In a pixel shuffler for performing a matrix transposition of data representing each of a plurality of video lines for a Reflective Liquid Crystal Display (RLCD) panel, an address generator for video pixel reordering within each of said lines, said address generator comprising:

a) an SRAM storing a sequence of pixel addresses for successive video lines for said RLCD panel and having at least one address input, a data input and at least one data output;

b) a combinatorial converter for converting an address value of a current video line to a corresponding address value of a successive video line;

c) a first buss connecting said converter output to said SRAM data input, whereby data from said SRAM is converted and written back to said SRAM; and d) a second buss connecting said at least one SRAM data output to a memory bank of said pixel shuffler, whereby said second buss delivers an address from said memory bank read-modify-write mode to operate upon a video pixel data stream permitting operation of said pixel shuffler with said memory bank requiring a limited capacity relative to conventional pixel shuffler memories.

2. The addresses generator of claim 1 wherein said combinatorial converter divides said input from said first buss into a most significant bit portion and a least significant bit portion, and adds the number present at said most significant bit portion to the product of the number present at said least significant bit portion and a constant integer multiplicand.

3. The address generator of claim 1 and further including a pixel counter having an output connected to said at least one SRAM address input.

4. The address generator of claim 3 and further including a pair of decoders connected to said pixel counter output.

5. The address generator of claim 3 and further including a line counter.

6. The address generator of claim 3 and further including a computing block for implementing a mirror reflection of said data streams.

7. The address generator of claim 1 wherein said SRAM has a capacity of 160×8 and said pixel shuffler memory bank has a capacity of 320×96.

8. A pixel shuffler for use in a remapper for reordering pixels within video lines for a reflective liquid crystal display (RLCD) system, said pixel shuffler comprising:

a) a single bank of first SRAM;

b) an address generator having a second SRAM and a combinatorial converter having a pair of inputs and an output equal to a predetermined relationship of said pair of inputs, said converter operating to modify individual values of address streams received from said second SRAM and to supply the modified values back to said second SRAM for writing by the latter of successive addresses into said second SRAM; and c) an address register for receiving said addresses from said address generator and sequentially providing said addresses to said first SRAM.

9. The pixel shuffler of claim 8 wherein said first SRAM comprises a single bank of 320×96 memory.

10. The pixel shuffler of claim 9 wherein said second SRAM comprises a small, dual port, SRAM 160×8.

11. The pixel shuffler of claim 8 wherein said address generator further comprises a pixel counter having a reset input connected to a horizontal synchronization signal of said RLCD system and an output connected to said second SRAM.

12. The pixel shuffler of claim 11 wherein said address generator further comprises a line counter having a reset input connected to a vertical synchronization signal of said RLCD system.

13. The pixel shuffler of claim 12 wherein said address generator further includes a computing block for implementing a mirror reflection of said successive addresses.

* * * * *